US006623833B2

(12) United States Patent
Chan

(10) Patent No.: US 6,623,833 B2
(45) Date of Patent: Sep. 23, 2003

(54) TOWEL FOLD CONFIGURATION

(75) Inventor: Michael Y. Chan, Alpharetta, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 45 days.

(21) Appl. No.: 09/951,600

(22) Filed: Sep. 13, 2001

(65) Prior Publication Data

US 2002/0051863 A1 May 2, 2002

Related U.S. Application Data

(60) Provisional application No. 60/244,465, filed on Oct. 31, 2000.

(51) Int. Cl.[7] .................................................. B32B 3/04
(52) U.S. Cl. ....................................... 428/126; 428/130
(58) Field of Search ............................... 428/126, 130; 221/48, 47; 206/494

(56) References Cited

U.S. PATENT DOCUMENTS 1,046,325 A    12/1912   Normand
1,511,812 A    10/1924   Horwitt
2,143,614 A     1/1939   Winter et al.
2,241,329 A     5/1941   Shaffer
3,007,605 A    11/1961   Donovan
3,047,141 A     7/1962   Burns
3,119,516 A     1/1964   Donovan
4,859,518 A     8/1989   Schultz
5,118,554 A     6/1992   Chan et al.

Primary Examiner—Alexander S. Thomas
(74) Attorney, Agent, or Firm—Dority & Manning

(57) ABSTRACT

A stack of interleaved towels is provided wherein each towel is configured from a sheet of material having a first fold offset from a centerline of the sheet to generate a folded sheet having a long side and a short side. A second fold in the folded sheet is made substantially parallel to the first fold to create a lead flap and a trailing flap. The lead flap presents a continuous folded leading edge for grasping by a user. The trailing flap is defined between the second fold and edges of the long side and short side. The trailing flap of each towel is disposed against the lead flap of an adjacent towel. In the stack, the short side of the trailing flap is disposed so that it is facing upwards upon a user grasping the lead flap and pulling the towel from a dispenser.

9 Claims, 2 Drawing Sheets

TOWEL FOLD CONFIGURATION

PRIORITY CLAIM

The present application hereby claims priority based on Provisional Application Serial No. 60/244,465, filed Oct. 31, 2000.

FIELD OF THE INVENTION

The present invention relates generally to configurations for interleaved folded paper towel products dispensed from sheet towel dispensers.

BACKGROUND

Various fold configurations are well known for use in the sanitary sheet products (i.e., paper towels, tissues, napkins, etc.) art. In general, different fold configurations have been utilized to reduce dimensions of the dispensed products and/or to facilitate the dispensing process. Known fold configurations include basic C-fold, V-fold, Z-fold, and numerous other configurations which may generally be referred to as "folded towels."

Typically, folded sheet towel products of the type dispensed in lavatories are stacked and banded together as a package for shipment and storage. For use, the stacked sheets are loaded into an appropriate dispenser. Often, due to the nature of the particular fold configuration, the stack of towels must be loaded with a specific orientation for proper grasping and dispensing by a subsequent user.

A primary and ongoing concern in the industry is to provide the user with a fold configuration that promotes efficient and non-wasteful dispensing of the towels.

One problem encountered with dispensing paper towels of conventional fold configurations is that the towels are typically folded and dispensed in a two-ply configuration that is not particularly amenable to being unfolded by the user into a larger single-ply sheet. The users are not likely to unfold the towel and perceive that the relatively "small" folded towel is not large enough to adequately dry their hands. After using one towel, the user will typically pull another towel to finish the drying process. This results is significant waste. Typically, a single towel in its single-ply unfolded state is more than adequate for drying the user's hands.

The present invention provides an improved fold configuration for stacked towel products and addresses the problem noted above with conventional fold configurations.

SUMMARY OF THE INVENTION

Objects and advantages of the invention will be set forth in part in the following description, or may be obvious from the description, or may be learned through practice of the invention.

In accordance with the invention, a stack of interleaved towels is provided with each individual towel having a unique fold configuration that enhances a user's ability to unfold the towel upon withdrawing the towel from a dispenser. Each towel is formed of a single sheet of material, typically a single-ply material. The towels according to the invention are not limited to any particular type of material and may be formed of any absorbent material for use as a towel, wiper, napkin, or other stacked absorbent product. The sheet material may be, for example, a non-woven, natural, or synthetic fiber material.

The single sheet of material is folded along a first fold line that is offset from a center line of the sheet to generate a two-ply folded sheet having a long side and a short side. In other words, the single sheet of material is not folded in half to produce two equal length sides, but is folded to produce sides of unequal length. A second fold is made in the folded two-ply sheet that is substantially parallel to the first fold. This results in a lead flap and a trailing flap. The lead flap is defined between the first fold and the second fold and presents a continuous folded leading edge along the first fold line for grasping by a user to withdraw the towel from a dispenser. The user thus is able to grasp a two-ply portion of the towel. The trailing flap is defined by the second fold and includes the long side and short side. Thus, the trailing flap is also a two-ply arrangement along a substantial portion thereof. The trailing flap is a single-ply where the long side extends beyond the short side.

In the stacked configuration of the towels, the trailing flap of each individual towel is disposed between lead flaps of the next two adjacent towels in an arrangement so that the short side of the trailing flap is disposed facing upwards upon a user grasping the lead flap and pulling the towel from a dispenser. Thus, when the individual towel is oriented in the stack so that the second fold is away from a dispensing side of the stack and the trailing flap and lead flap open towards a front or dispensing side of the stack, the short side of the trailing flap is adjacent to the lead flap. In the oppositely oriented towels wherein the second fold is positioned at the dispensing side of the stack and the trailing flap and lead flap open in the opposite direction, the long side of the trailing flap is adjacent to the lead flap. With this configuration, the short side of the trailing flap will always be facing upwards subsequent to a user pulling the lead flap of the towel to remove the towel from a dispenser. The short side of the trailing flap will be readily visible to the user and the length differential between the long side and the short side of the trailing flap presents to the user a "tab" to grasp and invites the user to unfold the towel into a larger single-ply sheet.

In one embodiment of the folded interleaved towels, the lead flap is shorter than the long side of the trailing flap. In this embodiment, the short side of the trailing flap may have about the same length as the lead flap.

Upon a user grasping the lead flap of a bottommost towel in the stack of towels and withdrawing the towel from a dispenser, the lead flap of the next or adjacent towel in the stack is automatically pulled through the dispensing slot or opening of the dispenser in readiness for further dispensing. Frictional engagement between the trailing flap of one towel and the lead flap of the adjacent towel ensures that the lead flap is pulled through the dispenser slot.

The invention will be described below with reference to an embodiment illustrated in the figures.

DETAILED DESCRIPTION

Figures 1A, 1B:
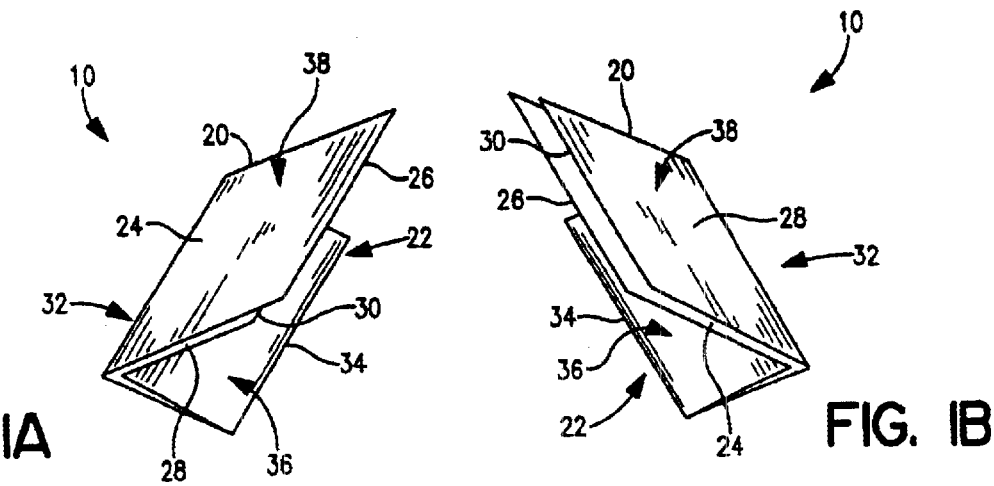
FIG. 1A is a perspective view of a single towel folded into a towel configuration of the present invention wherein the short side of the trailing flap is adjacent to the lead flap.
FIG. 1B is a perspective view of a single towel folded into the towel configuration of the present invention wherein the long side of the trailing flap is adjacent to the lead flap.

Reference will now be made in detail to embodiments of the invention, one or more examples of which are shown in the drawings. Each embodiment is presented by way of explaining the invention, and are not meant as a limitation of the invention. For example, features illustrated or described as part of one embodiment may be used with another embodiment to create still further embodiments. It is intended that the present invention include such modifications and variations.

A single towel 10 folded in a configuration according to the present invention is illustrated in the figures. The single sheet employed for towel 10 is single-ply in the figures, but may be multi-ply. In addition, the invention is not limited to any particular type of material, and includes any know material for forming absorbent products such as towels, wipes, napkins, and the like. The single sheet 20 is folded along a first fold line 22. Fold line 22 is offset from a center line of the single sheet 20 so that a long side 24 and a short side 28 are generated. In other words, the single sheet 20 is not folded in half. The fold line 22 is offset from the center line of the single sheet 20 by the length differential between long side 24 and short side 28. The long side 24 has an end edge 26 and the short side 28 has an end edge 30.

In the embodiment wherein the single sheet 20 is a single-ply material, the first fold 22 results in a two-ply folded configuration. A second fold 32 is made in the folded sheet which is substantially parallel to the first fold 22. Referring particularly to FIGS. 1A and 1B, the second fold 32 creates a lead flap 36 and a trailing flap 38. The lead flap 36 is defined between the first fold 22 and the second fold 32. The entire lead flap 36 is a two-ply configuration. The lead flap 36 has a folded leading edge 34 corresponding to fold line 22. This folded edge 34 is the leading portion of the lead flap 36 that extends through a dispensing slot or opening of a dispenser for grasping by a user, as particularly seen in FIG. 4. It is preferred that the user be presented with a two-ply lead flap 36 to reduce tearing of the towel 10 upon dispensing thereof. The force exerted by the user in pulling the towel 10 is transmitted through both plies of lead flap 36 thereby minimizing tab-out failures.

The trailing flap 38 is defined between the second fold 32 and the end edges 26, 30 of long side 24 and short side 28, respectively. Thus, the trailing flap 38 is a two-ply configuration along the length of short side 28 and a single-ply configuration along the remaining length of long side 24.

The second fold 32 is offset so that the lead flap 36 has a length shorter than the length of the long side 24 of the trailing flap 38. In the embodiments illustrated, the length of the leading flap 36 is about the same length as the short side 28 of the trailing flap 38. A length differential 40 between short side 28 and long side 24 may be in the range of about 2.0 to about 3.0 inches depending on the overall dimensions of the single sheet 20. This length differential 40 between short side 28 and the long side 24 presents a single-ply "tab" to the user upon subsequent dispensing of the towel and "invites" and enables the user to readily grasp this tab to unfold the towel 10 into a single-ply unfolded sheet of material 20 prior to use, as described in further detail below.

Figure 3:
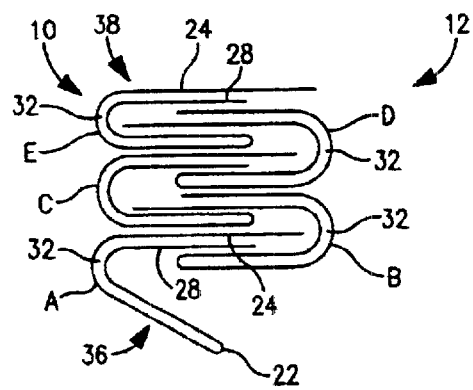
FIG. 3 is an end schematic view of an interleaved stack of towels having the full configurations of FIGS. 2A and 2B.

FIG. 3 illustrates a stack 12 of interleaved towels A through E according to the invention. The right hand side of the stack 12 corresponds to the dispensing side of the stack.

Figure 4:
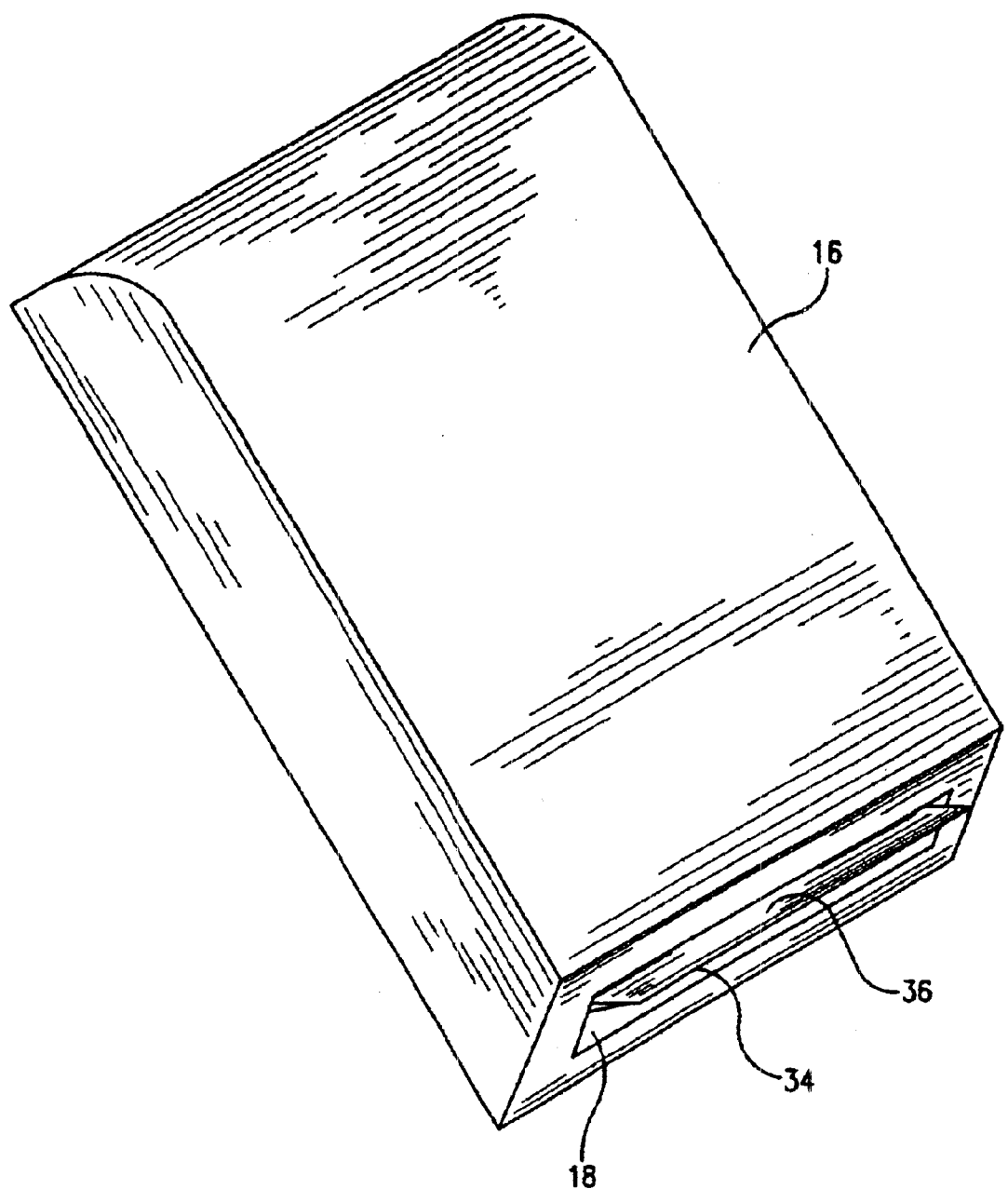
FIG. 4 is a perspective view of a conventional towel dispenser with the lead flap of a single towel extending through the dispensing opening.

In other words, the stack 12 is inserted into a dispenser 16 so that the second folds 32 of towels D and B are adjacent to the front side of the dispenser. The lead flap 36 of towel A will extend through the dispensing opening or slot 18 in the dispenser 16, as illustrated in FIG. 4. The towels are arranged in the stack 12 so that the short sides 28 of each of the trailing flaps 38 will be facing upwards and are clearly visible to the user upon the user grasping and pulling the respective lead flaps 36 to remove the towels from a dispenser. The short side 28 of each towel is presented towards the user regardless of the orientation of the respective towels within the stack 12. For example, the fold configuration of towel 10 illustrated in FIG. 2A corresponds to that of towels A, C, and E of the stack 12 illustrated in FIG. 3. In this particular fold configuration, the short side 28 of the trailing flap 38 is adjacent to the lead flap 36. The arrow F indicates the direction the lead flap 36 will be pulled by the user. As the lead flap 36 is pulled by the user, the trailing flap 38 is frictionally engaged between the lead flaps of the next two adjacent towels, respectively, and is eventually pulled out from between these lead flaps such that the towel 10 is unfolded at second fold 32 with the short side 28 facing upwards towards the user.

Figures 2A, 2B:
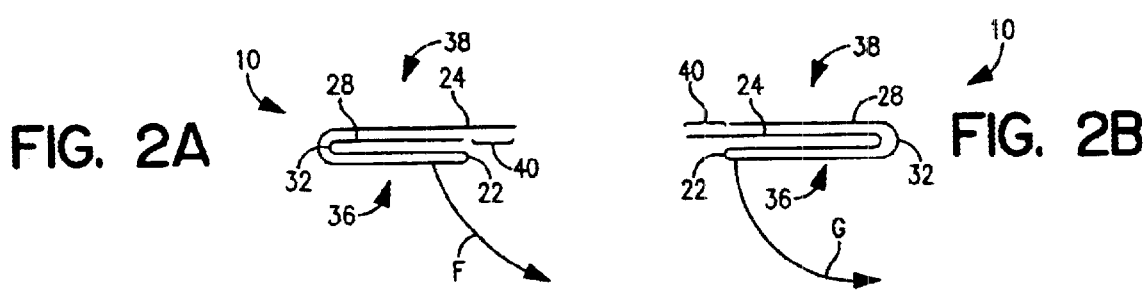
FIG. 2A is an end schematic view of a towel folded in accordance with the configuration of FIG. 1.
FIG. 2B is an end schematic view of a towel folded in accordance with the configuration of FIG. 1B.

The fold configuration shown in FIG. 2B corresponds to that of towels B and D in the stack 12 of FIG. 3. In this configuration, the long side 24 of the trailing flap 38 is adjacent to the lead flap 36. Referring to FIG. 2B, arrow G indicates the general direction along which the lead flap 36 is pulled by the user to dispense the towel. It can be appreciated that, in this configuration, the lead flap 36 will essentially pivot forward and down along second fold line 32 until the towel is in an essentially flat configuration with the trailing flap 38 frictionally engaged between the leading flaps of the next two uppermost towels. Upon subsequent pulling by the user, the trailing flap 38 is pulled from between the leading flaps of the towels and the towel is dispensed with the short side 28 of the trailing flap 38 facing upward towards the user.

Accordingly, the direction of the second fold 32 in each towel 10 will depend on the orientation of the towel within the stack 12. Where the trailing flap 38 and lead flap 36 open towards the front of the dispenser 16, as with towels A, C, and E, the short side 28 of the trailing flap 38 is adjacent to the lead flap 36. When the lead flap 36 and the trailing flap 38 open away from the front of the dispenser, as with towels B and D of FIG. 3, the long side 24 of the trailing flap 38 is adjacent to the lead flap 36.

The towels 10 according to the present invention may be dispensed from any conventional dispenser 16, for example a typical C-fold dispenser illustrated in FIG. 4. The only requirement of the dispenser is that it have appropriate dimensions and an appropriately sized dispensing slot to accommodate the interleaved stack of towels.

It should also be appreciated that the particular length of the short side 28, as well as the length of the lead flap 36, may vary depending on the overall dimensions of the single sheets 20 and the type of material from which the towel 10 is made. The trailing flap 38 should have a sufficient length so that the trailing flap is frictionally engaged with the adjacent towels in the dispenser until the lead flap of the towel is pulled from the dispenser by the user. This frictional engagement also causes the lead flap 36 of the next adjacent towel to be pulled through the dispenser slot 18 for subsequent grasping by the next user. It is within the level of skill of those skilled in the art to determine appropriate lengths of the various portions of the fold configuration according to the invention depending on the overall dimensions of the single sheets, type of material, etc.

In a dispensing test conducted using stacked interleaved sheets configured in accordance with FIG. 3, it was observed that the short side 28 of the trailing flap 38 was always presented to the user upon grasping and pulling the towels from a dispenser. It was also noted that upon dispensing of the towels configured within the stack with the second fold line 32 at the back of the dispenser (towels A, C, and E of FIG. 3), the short side of the trailing flap readily separated from the long side in the pulling process. With the oppositely configured towels (towels B and D of FIG. 3), the short side of the trailing flap did not always separate from the long side and, in such cases, the user had to separate the sides before opening the towel into a full single-ply sheet.

It should be appreciated by those skilled in the art that various modifications and variations can be made in the fold configuration according to the invention without departing from the scope and spirit of the invention. It is intended that the invention include such modifications and variations as come within the scope of the appended claims and their equivalents.

What is claimed is:

1. A stack of interleaved towels, each of said towels comprising:
    a sheet of material;
    a first fold in said sheet offset from a centerline of said sheet generating a folded sheet having a long side and a short side;
    a second fold in said folded sheet substantially parallel to said first fold creating a lead flap and a trailing flap;
    said lead flap defined between said first fold and said second fold such that said first fold presents a continuous folded leading edge for grasping by a user;
    said trailing flap defined between said second fold and edges of said long side and said short side;
    said trailing flap of each of said towel disposed between said lead flap and said trailing flap of an adjacent towel such that said towels are interleaved; and
    wherein said short side of said trailing flap is disposed so that said short side of said trailing flap is facing upwards upon a user grasping said lead flap and pulling said towel from a dispenser.

2. The stack of interleaved towels as in claim 1, wherein said sheet of material is a single-ply material and said firs fold creates as two-ply configuration for each said towel.

3. The stack of interleaved towels as in claim 1, wherein said lead flap is shorter than said long side of said trailing flap.

4. The stack of interleaved towels as in claim 1, wherein said short side of said trailing flap is adjacent said lead flap in towels wherein said trailing flap and lead flap open towards a front of a dispenser, and said long side of said trailing flap is adjacent said lead flap in towels wherein said training and lead flaps open away from a front of a dispenser.

5. The stack of interleaved towels as in claim 1, wherein said long side of said trailing flap is between about 2.0 and 3.0 inches longer than said short side of said trailing flap.

6. The stack of interleaved towels as in claim 1, wherein said short side of said trailing flap is about the same length as said lead flap.

7. A stack of interleaved towels, each of said towels comprising:
    a sheet of single-ply material;
    a first fold in said sheet offset from a centerline of said sheet generating a folded two-ply sheet having a long side and a short side;
    a second fold in said folded two-ply sheet substantially parallel to said first fold creating a lead flap and a trailing flap;
    said lead flap defined between said first fold and said second fold such that said first fold presents a continuous folded leading edge for grasping by a user;
    said trailing flap defined between said second fold and edges of said long side and said short side;
    said trailing flap of each of said towel disposed between said lead flaps of the next two upper adjacent said towels; and
    wherein said short side of said trailing flap is adjacent said lead flap in towels wherein said trailing flap and lead flap open towards a front of a dispenser, and said long side of said trailing flap is adjacent said lead flap in towels wherein said trailing and lead flaps open away from a front of a dispenser.

8. The stack of interleaved towels as in claim 7, wherein said lead flap is shorter than said long side of said trailing flap.

9. The stack of interleaved towels as in claim 8, wherein said lead flap is about the same length as said short side of said trailing flap.

* * * * *